United States Patent [19]

Furukawa et al.

[11] 4,322,732
[45] Mar. 30, 1982

[54] INK JET RECORDING METHOD

[75] Inventors: Tatsuya Furukawa; Sadao Kakeno, both of Yokohama, Japan

[73] Assignee: Ricoh Co., Ltd., Tokyo, Japan

[21] Appl. No.: 64,104

[22] Filed: Aug. 6, 1979

[30] Foreign Application Priority Data

Dec. 8, 1978 [JP] Japan ................................. 53/98308

[51] Int. Cl.³ .......................................... G01D 15/18
[52] U.S. Cl. ..................................................... 346/75
[58] Field of Search ......................................... 346/75

[56] References Cited

U.S. PATENT DOCUMENTS 3,769,631 10/1973 Hill ........................................ 346/75
3,813,676 5/1974 Wolfe ................................... 346/75
3,864,692 2/1975 McDonnell .......................... 346/75
4,034,379 7/1977 Berry ................................ 346/75 X
4,054,882 10/1977 Ruscitto ............................ 346/75 X Primary Examiner—Joseph W. Hartary
Attorney, Agent, or Firm—Burgess, Ryan and Wayne

[57] ABSTRACT

An electrostatic type ink-jet recording method wherein ink drops issuing from a nozzle are never placed adjacent one another in the direction of the deflection. According to one embodiment of the present invention, when a number of n contiguous ink dots are to be formed in each column in the direction of the deflection by deflecting the charged ink drops at a rate of a number of n ink drops per deflection interval, a number of n ink dots are divided into a number of m groups (where m<n) each consisting of a number of n/m ink dots spaced apart from each other by a distance nearly equal to m times the diameter of the ink dots, and in response to a print signal a first group of ink dots are formed in one deflection interval, next a second group are formed in the one deflection interval, and so on until a m-th group are formed, whereby the merging and bouncing apart of charged ink drops may be avoided.

1 Claim, 6 Drawing Figures

FIG. 2
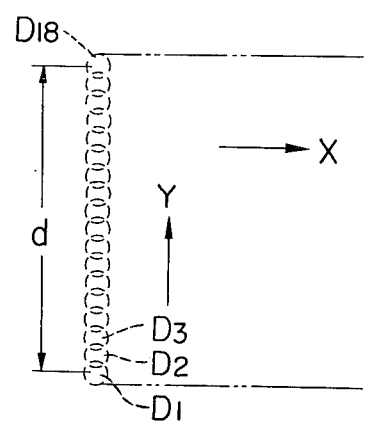
FIG. 4
(a) (b) (c)
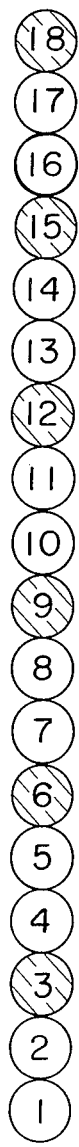  

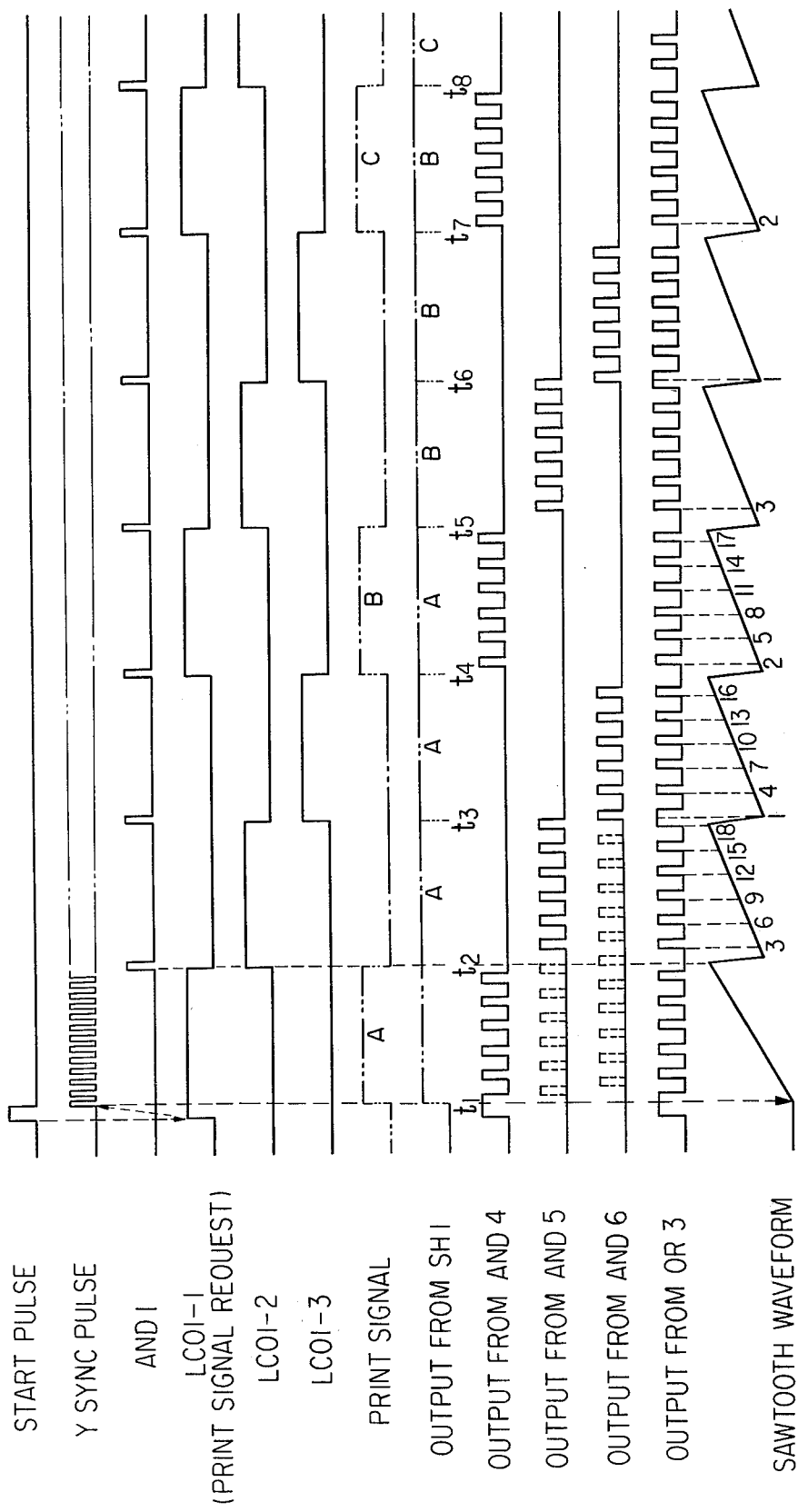

INK JET RECORDING METHOD

BACKGROUND OF THE INVENTION

The present invention relates to an electrostatic type ink jet recording method wherein ink drops issuing from a nozzle are charged uniformly or varyingly and steered to a recording medium through a varying or uniform electric field.

In the prior art ink jet recording methods of the type described, the lengthwise and widthwise directions of a recording medium are selected as the auxiliary scanning direction Y and the main scanning direction X respectively. A print head or a recording medium is moved in the direction X while the ink drops are deflected in the direction Y so that a number of m ink drops may be placed in one column during one main scanning interval. Therefore, the recording medium is shifted to one line direction Y (auxiliary scanning), whenever the main scanning in one column is terminated. Since the charged ink drops are deflected stepwise, a predetermined number of ink drops are contiguously placed on a recording medium in the direction Y. Therefore the time interval from the time when one ink drop is placed on a recording medium to the time when an adjacent ink drop is placed is equal to the ink drop formation period Td, which is very short. As a result, before the preceding ink drop is sufficiently soaked into a recording medium, the succeeding ink drop impinges against it adjacent to the position where the preceding ink drop has been placed so that the two ink drops merge into a single, large blob instead of leaving two clear and distinct ink dots, thus degrading the printing quality. In addition, the two successive ink drops tend to bounce apart from each other, landing often at unpredictable positions, thus causing misalignments among ink dots, degrading the printing quality and contaminating the print head.

SUMMARY OF THE INVENTION

In view of the above, the primary object of the present invention is to provide an ink-jet recording method which may substantially eliminate the merging and bouncing apart of ink drops on a recording medium, whereby high quality printing without misalignment or contamination may be attained.

To the above and other ends, the present invention provides an ink-jet recording method wherein a number of n dots to be formed in one column in the direction of the deflection Y are divided into a plurality of groups (equal to m<n) which are spaced apart from each other by a distance at least nearly equal to one ink dot, and a first through m-th group of ink dots are sequentially formed during m deflection intervals.

BRIEF DESCRIPTION OF THE DRAWINGS

FIG. 2 is a view looking at a recording paper 11 in FIG. 1 from the side of a nozzle 1;

FIG. 3 shows a timing chart used for the explanation of the mode of operation of the ink jet printer shown in FIG. 1; and FIG. 4 shows the steps a, b and c for forming 18 ink dots in one column in accordance with the present invention.

DESCRIPTION OF THE PREFERRED EMBODIMENT

Figure 1B:
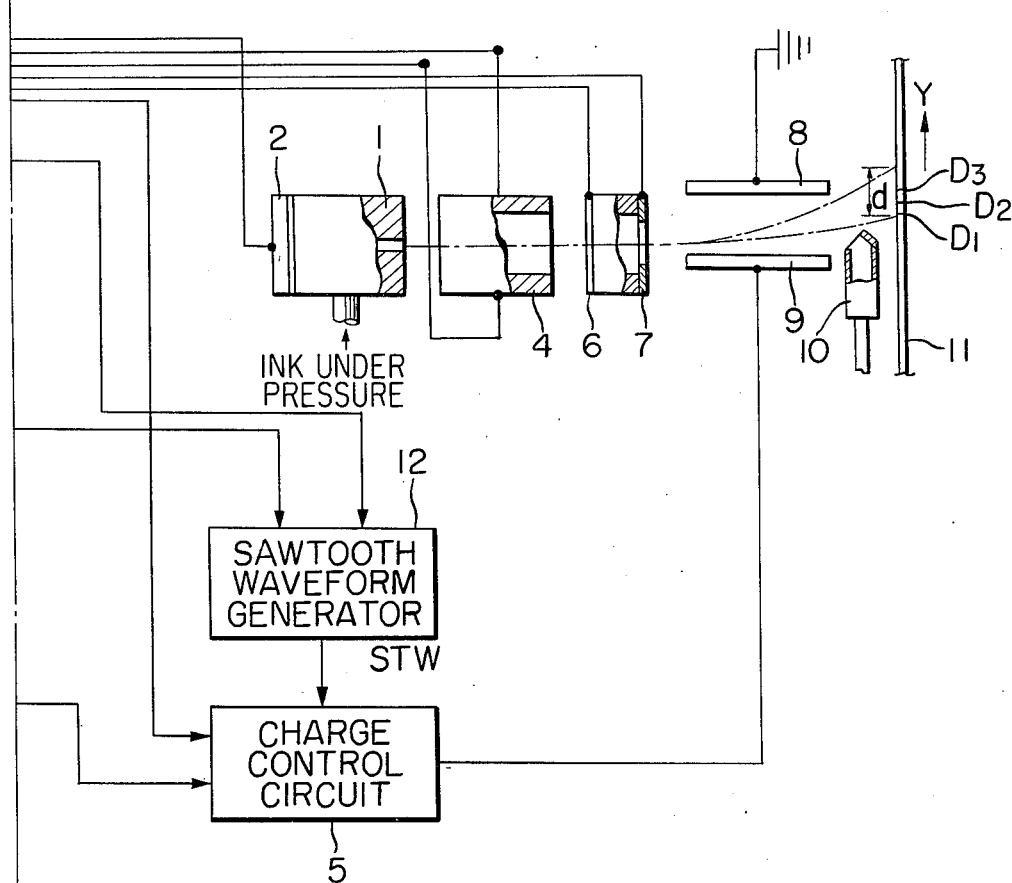
FIG. 1 (comprising FIGS. 1A and 1B) is a block diagram of an ink-jet printer adapted for carrying out an ink jet recording method in accordance with the present invention.
FIG. 1C illustrates an alternative embodiment of the invention.
Figure 1:
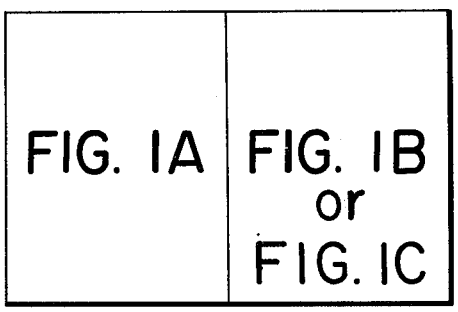
Figure 1A:
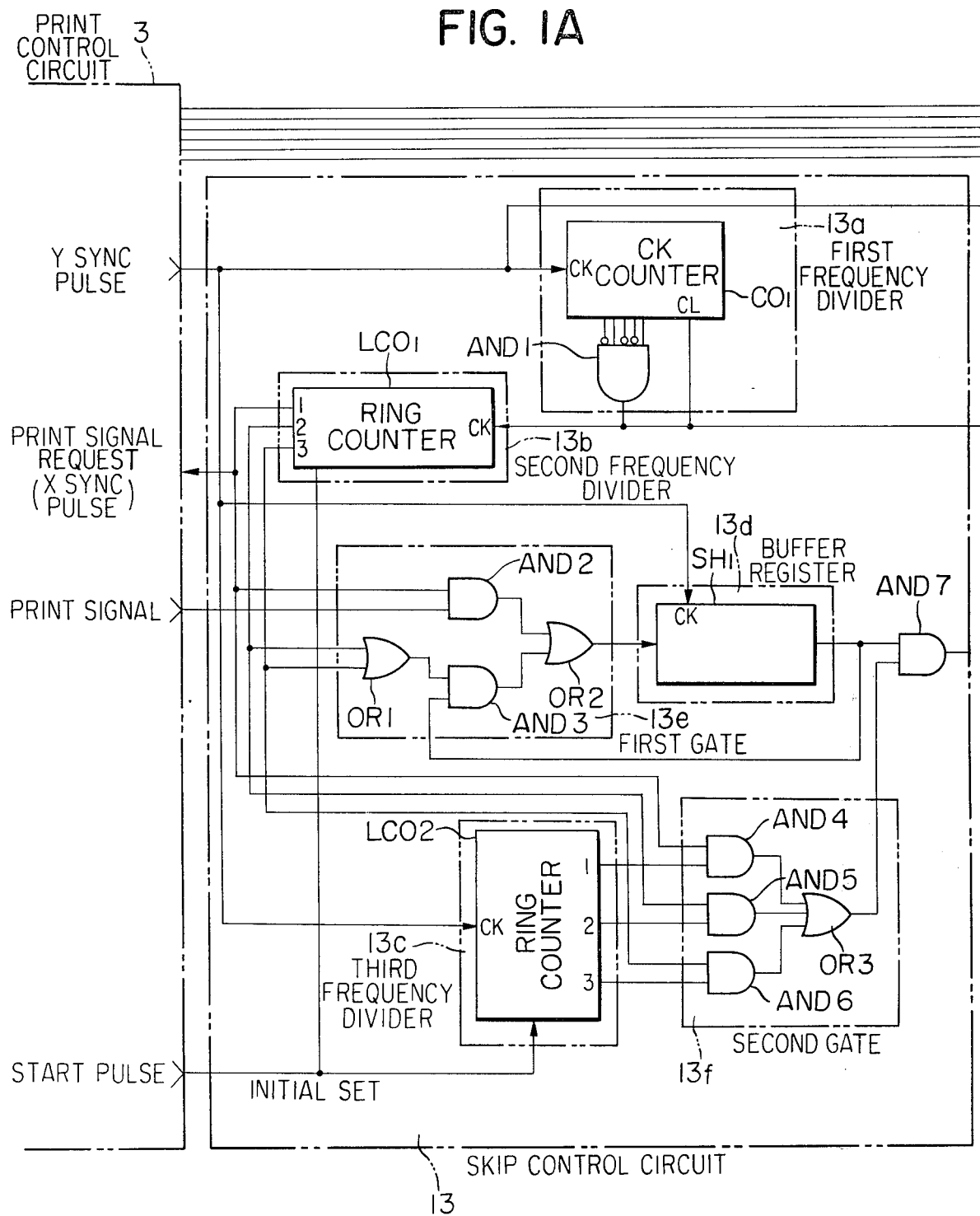

In FIG. 1 is shown a block diagram of a deflection type ink jet printer adapted to carry out the method in accordance with the present invention, and in FIG. 3 are shown the waveforms of various signals generated at various points in the block diagram shown in FIG. 1. Referring first to FIG. 1, an ink drop generator has a nozzle 1 and a piezoelectric crystal or an ultrasonic transducer 2 activated with the sinusoidal output voltage supplied from an oscillator (not shown) within a print control circuit 3. The ink under pressure is supplied to the ink drop generator and emerges from the nozzle 1 as an ink jet. A charge electrode 4 is located at such a position where the ink jet breaks into drops and ink drops may be charged in proportion to the charge control signals from a charge control circuit 5. After leaving the charge electrode 4, the ink drop passes through charge detecting electrodes 6 and 7 and is directed by deflection electrodes 8 and 9 to a gutter 10 or to a recording paper 11.

Prior to the printing or at every return of a print head during the printing operation, a constant voltage is applied from the charge control circuit 5 to the charge electrode 4 in a predetermined phase relationship with the timing for breaking the ink jet into drops so that the ink drops are charged. The charge on each ink drop is detected by the charge detecting electrodes 6 and 7, and in response to the output signal from the charge detecting electrodes 6 and 7, a charging phase setting circuit (not shown) in the print control circuit 3 causes the charging voltage to shift in phase so as to search for an optimum phase of the charging voltage so that each ink drop may be charged optimally. Once the optimum charging phase has been selected in the manner described above, the charge control circuit 5 is set to apply the charging voltage to the charge electrode 4 at the selected phase. In printing mode, a sawtooth waveform generator 12 delivers the sawtooth waveform voltage of, for instance, the maximum peak value of 400 V and the minimum peak value of 200 V to the charge control circuit 5. A skip control circuit 13 also delivers the charging voltage output instruction to the charge control circuit 5.

The nozzle 1, the print control circuit 3, the charge electrode 4, the charge control circuit 5, the charge detecting electrodes 6 and 7, the deflection electrodes 8 and 9, the gutter 10, and the sawtooth waveform generator 12 are similar in both construction and mode of operation to those in the prior art electrostatic ink jet printer. However the skip control circuit 13 is added in order to carry out the present invention and comprises a first frequency divider 13a, a second frequency divider 13b, a third frequency divider 13c, a buffer register 13d, a first gate 13e, a second gate 13f, and an AND gate AND7.

The first frequency divider 13a comprises a counter CO1 and an AND gate AND1 connected to the counter CO1 in such a way that the AND gate AND1 outputs a high level signal "1" when the counter CO1 has counted the value "18" (10010). In this embodiment, it is assumed that 18 dots be placed in a column or deflection width d shown in FIG. 1 on the recording paper 11 so that the first frequency divider 13a is so designed and constructed to deliver the pulses whose frequency is 1/18 of the frequency of the input pulses. That is, as shown in FIG. 2, 18 dots may be placed on the recording paper 11 within the column height d in the auxiliary scanning direction Y. The counter CO1 counts the Y sync pulses whose frequency is same as that of the sinusoidal voltage applied to the ultrasonic transducer 2. That is, whenever one ink drop is formed, one Y sync pulse is delivered to the counter CO1. As described above and shown in FIG. 3, the AND gate AND1 outputs the pulses whose frequency is 1/18 of the Y sync pulses.

The output pulses from the AND gate AND1 is delivered to a ring counter LCO1 in the second frequency divider 13b. When the ring counter LCO1 is it outputs a high level signal "1" at its first output terminal 1. Every time when the ring counter LCO1 receives the input pulse at its shift pulse input terminal CK, the high level output shifts to the next output terminal; that is, the high level signal "1" moves around the loop consisting of the output terminals 1-2-3-1. Therefore assume that the ink drop formation period be Td. Then the first frequency divider 13a outputs the pulses whose pulse width 18 Td which is substantially equal to the pulse width of the Y sync pulses, but the second frequency divider 13b sequentially outputs three pulses (LCO1, LCO2 and LCO3 in FIG. 3) which are uniform in pulse width of 18 Td and period of $18 \times 3$ Td but are out of phase by 18 Td from each other.

The third frequency divider 13c comprising also a ring counter LCO2 is substantially similar in mode of operation to the second frequency divider 13b described above in that in response to the Y sync pulses it outputs three cyclic pulses which are uniform in pulse width of Td and period of 3 Td but are out of phase from each other by Td.

The buffer register 13d comprises a 18-bit serial shift register SH1 whose contents is shifted in response to the Y sync pulses. The input terminal of the shift register SH1 receives the print signal through an AND gate AND2 and an OR gate OR2 in the first gate circuit 13e. The output from the shift register SH1 is also input to its input terminal through an AND gate AND3 and the gate OR2.

The second gate circuit 13f comprises AND gates AND4 through AND6 and an OR gate OR3 interconnected in such a way that one of the first, second and third pulses from the third frequency divider 13c or the ring counter LCO2 may be selectively output to the gate AND7.

Next further referring to FIG. 3, the mode of operation of the ink jet printer with the above described construction will be described. The ink under pressure is supplied to the ink drop generator whose ultrasonic transducer 2 is input with the sinusoidal exciting voltage of the period of Td as described elsewhere. The ink jet issuing from the nozzle 1 breaks into ink drops in the charge electrode 4, the period or interval of the ink drops being Td. The ink drops passes through the charge detecting electrodes 6 and 7 and the deflection electrodes 8 and 9 and reaches the gutter 10. A charging phase searching voltage is applied to the charge electrode so that an optimum charging phase may be selected as described elsewhere. In response to the selected charging phase, the charge control circuit 5 is set to output the charge voltage at the selected charging phase and the optimum charging phase searching voltage is turned off. Thereafter the start pulse is input from the print control circuit 3 to the skip control circuit 13, whereby the both the ring counters LCO1 and LCO2 are set and consequently their first output terminals 1 rises to a high level "1". When the print control signal 3 detects that the first output terminal 1 of the ring counter LCO1 has risen to a high level "1"; that is, when the print control circuit 3 receives the print signal request signal, it outputs the Y sync pulses and the print signal A in synchronism with the Y sync signal to the skip control circuit 13. The print signal A permits the placement of ink dots in one column d on the recording paper 11.

Since the first output terminal 1 of the ring counter LCO1 is high "1", the print signal A is transferred through the gates AND2 and OR2 into the shift register SH1 (See the time interval $t_1$-$t_2$ in FIG. 3). At the time $t_2$ when the print signal A has been completely stored in the shift register, the first frequency divider 13a outputs a high level signal "1" so that the high level signal "1" is shifted to the second output terminal 2 of the ring counter LCO1 and consequently the print control circuit 3 will not receive the print signal request signal; that is, the print signal request signal drops to a low level. As a result, the gate AND2 in the first gate circuit 13e is disabled while the gate AND3 is enabled. The gate AND5 in the second gate circuit 13f is also enabled. As a result, the control circuit 3 stops sending the print signal but continues to output the Y sync pulses so that the shift register 13d or SH1 outputs the print signal A and applies it to the input terminal thereof through the gates AND3 and OR2. In this case, the second output pulse LCO2-2 from the second output terminal 2 of the ring counter LCO2 is applied to the and gate AND7 through the gates AND5 and OR3 in the second gate circuit 13f so that in synchronism with this output pulse, the print signal is read out from the shift register SH1 and applied through the gate AND7 to the charge control circuit 5.

At the phase angles 3,6,9, ... , and 18 of the sawtooth waveform STW (strictly speaking, within an optimum charging time interval equal to the pulse width of the output pulse from the gate OR3 which rises at each selected phase angle from 3 through 18), the switching means within the charge control circuit 5 is turned on so that the charge voltage may be applied to the charge electrode 4. The level of the voltage applied to the charge electrode 4 corresponds to the level of the sawtooth waveform voltage STW at the selected phase angles 3 through 18. The above ink drop charging operation is carried out only when the print signal represents the ink dot placement, but when the print signal does not represent ink dot placement, the output from the shift register SH1 is "0" so that the output from the gate AND7 is also "0" and consequently the switching means in the charge control circuit 5 remains turned off. Thus during the time interval $t_2$-$t_3$, six ink dots are recorded in response to the print signal A, the ink dots being spaced apart from each other by a distance equal to twice the diameter of the ink dots.

At the time point $t_3$; that is, when the six ink dots are placed on the recording paper 11 as described above, the first frequency divider 13a outputs "1" so that the third output terminal 3 of the ring counter LCO1 rises high "1" so that the gate AND6 in the second gate circuit 13f is enabled and consequently the output pulse from the third output terminal 3 of the ring counter LCO2 is applied to the AND gate AND7. The output pulse from the third terminal 3; that is, the output pulses from AND6 in FIG. 3 is out of phase with the output pulse from the second output terminal; that is, the output pulses from AND5 in FIG. 3, by Td. As a result, six ink dots are placed on the recording paper 11 adjacent to the previous placed ink dots, respectively, as will be described in detail below.

Referring to FIG. 4, during the first ink dot placement period $t_2-t_3$, the ink dots represented by the hatched dots 3 through 18 in FIG. 4a were placed. During the second period $t_3-t_4$, the ink dots 1,4,7, ..., and 16 are placed as shown in FIG. 4b.

At the time $t_4$, the first frequency divider of the ring counter LCO1 rises high "1" so that the gate AND3 is disabled and the gate AND2 is enabled in the first gate circuit 13e. In the second gate circuit 13f the gate AND4 is enabled. As a result, the shift register SH1 outputs the print signal A and inputs the print signal B in response to which 18 ink dots are to be placed in the next column. While the shift register SH1 is outputting and inputing in the manner described above, the output pulse from the first output terminal 1 of the ring counter LCO2 is applied to the gate AND7 through the gates AND4 and OR3. The first output pulse from the ring counter LCO2 is out of phase with the third output pulse (AND6 in FIG. 3) from the third output terminal 3 by Td so that the ink dots 2,5,8, ..., and 17 shown in FIG. 4c are placed. Thus one column has been printed, and the next column is started to be printed in response to the next print signal B in a manner substantially similar to that described above.

As described above, according to the present invention the 18 continuous ink dots are placed in each column in the direction of the ink drop deflection by three steps in each of which six ink drops, which are spaced apart from each other by two ink drops, sequentially impinge the predetermined points in each column which are also spaced apart from each other by a distance nearly equal to twice the diameter of the ink dots. Because of this skipping or stepping ink drop placement method, 18 Td elaspes from the time when one ink dot is formed to the time when an adjacent ink dot is formed so that the preceding ink drop may be completely soaked into the recording paper before the ink drop impinges at an adjacent point. However the ink dot printing speed becomes about one third of that of the prior art ink-jet printer, but it is possible to maintain the same speed by decreasing Td to one third; that is, during a time interval for placing 18 ink dots by the prior art method, $18 \times 3$ dots are placed. As described above, according to the present invention, a time interval from the time when one ink dot is formed to the time when an adjacent ink dot is formed is six (18/3) times as long as a corresponding time interval in the prior art sequential ink dot formation method so that the preceding ink drop may be completely soaked into the recording paper before an adjacent ink drop impinges the recording paper.

So far the present invention has been described as placing a number of n (=18) continuous ink dots in each column with the height d in the direction Y by three deflection steps in each of which six ink dots are formed, but it is to be understood that one column may be printed by two or four steps as will be described below.

First the method for printing one column by two steps will be described. The second frequency divider 13b in FIG. 1 is modified so as to output the pulses having the pulse width of 18 Td and the period of $18 \times 2 \times Td$. That is, the ring counter LCO2 has two output terminals 1 and 2 and is therefore a flip-flop. In the first gate circuit 13e, the gate OR1 is eliminated and the first output terminal 1 of the ring counter LCO1 is connected to the gate AND2 while the second terminal 2, to the gate AND3. In like manner, the third frequency divider 13c is so modified as to output first and second pulses which are uniform in pulse width of 2 Td and period of 4 Td but are out of phase from each other by 2 Td. Therefore the ring counter LCO2 has two output terminals 1 and 2 and is a flip-flop. In the second gate circuit 13f, the gate AND6 is eliminated.

With these modifications, 18 Td elapes from the time when one ink dot is formed to the time when an adjacent ink dot is formed. This time interval is 18 times as long as a corresponding time interval in the prior art method. However, the ink dot printing speed drops to $\frac{1}{2}$, but the same speed may be attained by decreasing Td to $\frac{1}{2}$. As compared with the prior art sequential not placement method, the time interval from the time when one dot is formed to the time when an adjacent dot is formed becomes 9 times (18/2).

When it is desired to print one column by more than four steps, which are m, each of the ring counters LCO1 and LCO2 is so modified as to have a number of m output terminals. The output terminals from 2 through m of the ring counter LCO1 and connected to the gate OR1. The output terminals of the ring counter LCO2 are connected to a number of m AND gates, respectively, in the second gate circuit 13f, which in turn are connected to the common OR gate OR3.

So far the present invention has been described in conjunction with the ink-jet printer of the type described above with reference to FIGS. 1 through 4, but it will be understood that the present invention may be equally applied to the ink jet printers of any types. For instance, the buffer memory 13d may comprise a random access memory, and the skip control circuit 13 may be computerized. Furthermore the print control circuit 3 may be computerized and a program may be stored in its read-only memory so that the print control circuit 3 may accomplish the function of the skip control circuit 13.

So far the present invention has been described in conjunction with the electrostatic type ink-jet printer wherein the charge imparted to each ink drop is varied, but it will be understood that the present invention may be equally applied to the electrostatic type ink-jet printer of the type wherein the deflection voltage is varied. That is, as illustrated in FIG. 1C a constant voltage is applied to the charge electrode 4 while the output from the charge control circuit 5 is impressed between the deflection electrode 8 and 9 and is controlled in synchronism with the detection of the charged ink drops by the charge detecting electrodes 6 and 7.

In summary, according to the present invention even when the dot printing speed is maintained same as that in the prior art method, a time interval from the time when one dot is formed until the time when an adjacent ink dot is formed may be increased from a few times to tens times as compared with the prior art method so that the preceding ink drop may be completely soaked into the recording medium before the adjacent ink drop impinges on it. As a result, the ink drops may be prevented from merging, resulting in a single, larger blob and from bouncing from each other, landing often at unpredictable positions. Thus the contamination of the recording medium may be avoided and high-quality printing may be ensured.

What is claimed is:

1. Ink jet printing apparatus for depositing adjacent columns, each consisting of n contiguous ink drops, in m sequentially staggered groups each consisting of about n/m ink drops, the spacing between the ink drops of each group being nearly m times the ink drop diameter, so that said groups interlace with each other to form each of said columns, comprising:

an ink drop generator for forming an ink jet which subsequently breaks into a stream of ink drops;

a charge electrode for selectively charging the ink drops of said stream in synchronism with the generation of said drops by said ink drop generator;

means for deflecting the charged ink drops in accordance with the charge thereof;

a print control circuit for driving said ink drop generator;

a charge control circuit for driving said charge electrode;

a sawtooth generator for generating successive sawtooth waveform cycles to vary the magnitude of the charge applied to said charging electrode by said charge control circuit, between the ends of each of said columns; and a skip control circuit coupled to said print control circuit, said sawtooth waveform generator and said charge control circuit for enabling said charge control circuit only during time intervals corresponding to the generation of one of said groups of ink drops during each cycle of said sawtooth waveform, and for enabling said charge circuit during time intervals corresponding to the generation of different ones of said groups of ink drops during successive cycles of said sawtooth waveform, so that one complete column of ink drops is generated each m cycles of said sawtooth waveform, said skip control circuit comprising:

a first frequency divider having an input coupled to said print control circuit, and an output coupled to said sawtooth waveform generator;

a second frequency divider having an input coupled to the output of said first frequency divider, and a plurality of outputs;

a third frequency divider having an input coupled to said print control circuit, and a plurality of outputs;

a first gate means having a plurality of inputs coupled to corresponding ones of the outputs of said second frequency divider, a first auxiliary input for receiving a print signal from said print control circuit, and a second auxiliary input;

a second gate means having a first plurality of inputs coupled to corresponding ones of the outputs of said second frequency divider, a second plurality of inputs coupled to corresponding ones of the outputs of said third frequency divider, and an output for indicating when one of said first plurality of inputs occurs simultaneously with a corresponding one of said second plurality of inputs;

a buffer register having a first input coupled to said print control circuit, a second input coupled to the output of said first gate means, and an output coupled to the second auxiliary input of said second frequency divider; and an AND gate having a first input coupled to the output of said buffer register, a second input coupled to the output of said second gate means, and an output coupled to said charge control circuit, said print control circuit including means for causing selected ones of said drops to be eliminated from said stream in accordance with character printing information.

* * * * *